United States Patent [19]

Mahan

[11] Patent Number: 4,652,040
[45] Date of Patent: Mar. 24, 1987

[54] PICKUP TRUCK TENT ARRANGEMENT WITH TAILGATE ENVELOPE, AND METHOD

[76] Inventor: Richard L. Mahan, Rte. 12, Box 74, Bentonville, Ark. 72712

[21] Appl. No.: 837,716

[22] Filed: Mar. 10, 1986

[51] Int. Cl.⁴ ................................................ B60P 3/32
[52] U.S. Cl. ............................................... 296/159
[58] Field of Search ................. 296/159, 160, 161, 26, 296/27; 135/88

[56] References Cited

U.S. PATENT DOCUMENTS

| | | | |
|---|---|---|---|
| Re. 29,264 | 6/1977 | Woodward | 296/159 |
| 2,621,836 | 12/1952 | McMiller | 296/160 |
| 3,354,891 | 11/1967 | Brown | 296/159 |
| 3,623,690 | 11/1971 | Bargman, Jr. | 296/167 |
| 3,649,063 | 3/1972 | Stark | 296/159 |
| 3,734,110 | 5/1973 | Burns | 135/88 |
| 3,737,190 | 6/1973 | Smith | 296/159 |
| 3,746,386 | 7/1973 | Woodward | 296/159 |
| 4,065,166 | 12/1977 | Shoemaker | 296/159 |
| 4,093,302 | 6/1978 | Adams | 296/156 |
| 4,192,543 | 3/1980 | Crawford | 296/159 |
| 4,215,894 | 8/1980 | Sidlinger | 296/167 |
| 4,263,925 | 4/1981 | Arganbright | 135/88 |
| 4,294,484 | 10/1981 | Robertson | 296/156 |
| 4,296,960 | 10/1981 | Winchester | 296/167 |
| 4,310,194 | 1/1982 | Biller | 296/159 |
| 4,332,265 | 6/1982 | Baker | 296/159 |
| 4,504,049 | 3/1985 | Straub | 296/165 |

Primary Examiner—Robert R. Song
Attorney, Agent, or Firm—Litman Day & McMahon

[57] ABSTRACT

A pickup truck tent arrangement with tailgate envelope is provided. Generally, the arrangement includes a frame mountable in a pickup truck to support a tent covering thereover, to form a tent or camper unit. The tent covering includes a rear member facing generally rearwardly of the truck and having an envelope portion mounted thereon. The envelope portion is sized to receive a portion of the tailgate of the truck therein, during camper assembly. In this manner, the rear portion of the tent covering is anchored to the tailgate, and the tailgate is received within and under the tent covering. The tent arrangement illustrated utilizes a tent frame comprising first and second diagonally arching cross-members, which form a frame for the tent covering to rest upon. In the preferred embodiment, as a result of the tailgate envelope the tent covering is maintained under tension over the frame, and is stretched beyond a rear bumper of the truck. The invention also includes provision of a method by which a tailgate of a pickup truck can be received within and covered by a tent covering mounted over the bed of the truck. According to the method, the tailgate is used to supply an anchor, beyond a rear bumper of a truck, for securing the tent covering.

6 Claims, 5 Drawing Figures

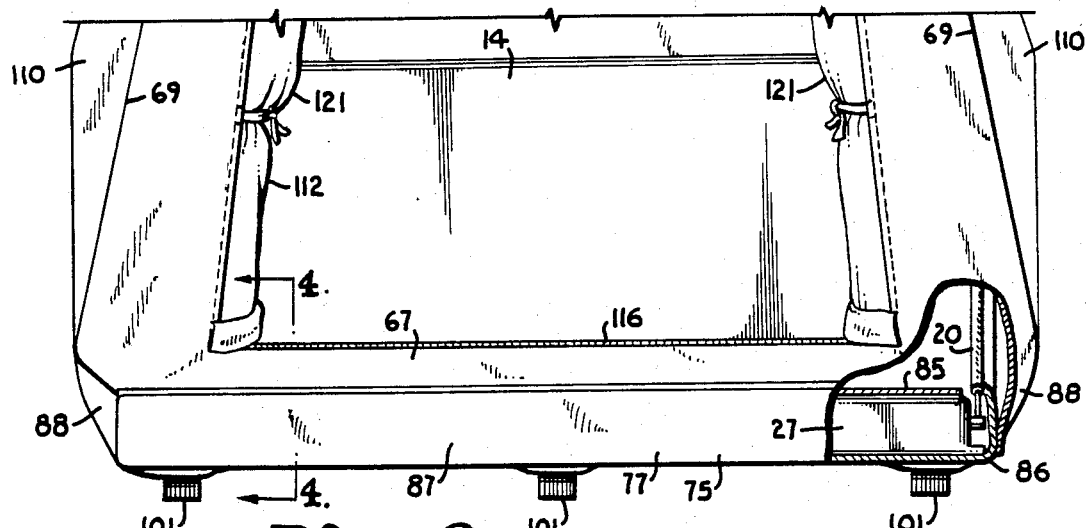
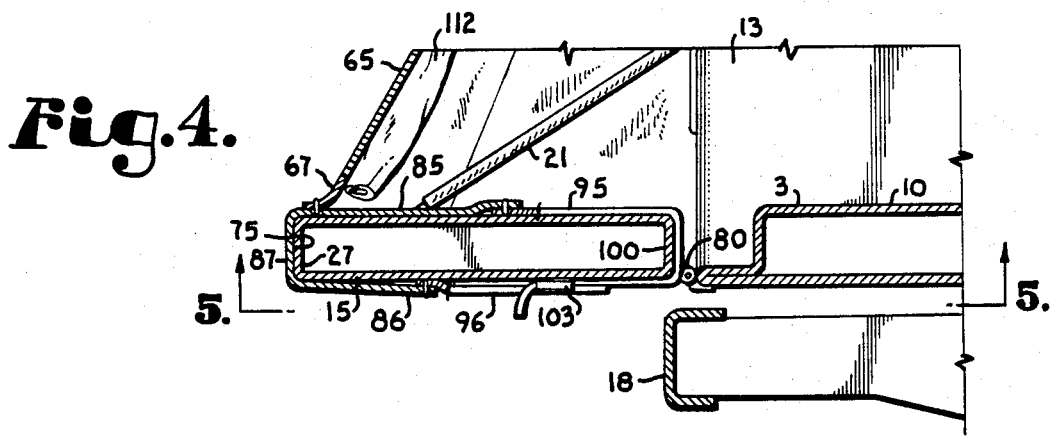
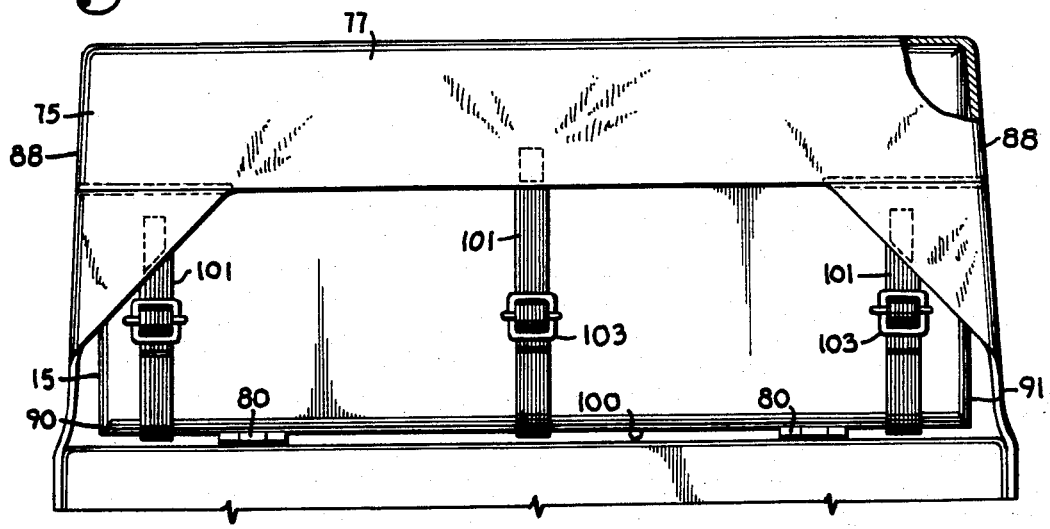

PICKUP TRUCK TENT ARRANGEMENT WITH TAILGATE ENVELOPE, AND METHOD

BACKGROUND OF THE INVENTION

The present invention relates to campers and in particular to campers in which a tent, comprising a tent cover and frame, is mounted upon a truck bed, such as a pickup truck bed, to form a shelter or the like. More specifically, the invention relates to a means for attachment of such tents to a tailgate of such trucks by insertion of the tailgate into an envelope member associated with the tent covering.

Conventional campers are of numerous types. For example there are: the well known shell which rests upon rear sidewalls of a pickup truck; the hard-walled camper which fits within the bed of a pickup truck; and, flexible-walled camper systems which utilize a tent or tent-like covering mounted upon a frame attached to the truck. The present invention relates to a camper unit of the latter type.

Conventional flexible walled camper units generally comprise a frame portion and a tent covering portion. The frame portion generally corresponds to a conventional tent frame, with tent pole members attached to the truck and generally oriented over the pickup truck bed. The tent covering may be of canvas, nylon, or similar material, and generally is spread over the tent frame to enclose the camper and truck bed.

As indicated above, generally such conventional camper units are mounted in trucks such as pickup trucks, which have a rear tailgate member that can be lowered to a position flush with the bed of the truck. Thus, the tailgate may be used to effectively extend the length of the bed beyond a rear bumper portion of the truck.

With conventional tent camper arrangements, there have been some problems with accommodating the tailgate. In some arrangements, the tailgate cannot be enclosed within the tent camper, so the ability of the tailgate to extend the length of the bed to make for more room is not utilized. In arrangements where the tailgate is enclosed within the tent, a complex frame system may be required and/or special attachment means mounted on the tailgate may be necessary in order to provide for secure engagement between the tent covering and the tailgate. Such systems may be relatively expensive, difficult to assemble or disassemble, may require special modifications to the truck, truck frame or body, and may be unattractive.

Another problem with past systems has been the their general failure to provide an appropriate anchor point for securing the tent covering and frame. For a conventional tent mounted upon the ground, generally stakes and laterally extending lines, often referred to as guy-lines, are used to maintain tension on the frame of the tent, by placing tension on the tent covering or poles, to support the tent frame in an upright position and maintain same against strong winds or the like.

In conventional tent camper arrangements mounted upon truck beds, however, generally such guy-lines and stakes are undesired as they inhibit the ability to move the vehicle, even slightly, with the camper erected; and, further, they prevent the camper unit from being used over hard surfaces such as pavement, asphalt or firmly graded ground, where the driving of stakes would be difficult if not impossible. Generally, in the past, this has necessitated the development of complex frame systems, for use with such trucks, which are free standing in that they do not use guylines either attached directly to the frame or on the tent covering over the frame, for secure erection. Even conventional tent camper systems which have enclosed the tailgate therein, have generally failed to utilize the tailgate as a laterally extended anchor point serving as a substitute for a guy-line and stake.

OBJECTS OF THE INVENTION

Therefore, the objects of the present invention are: to provide a tent camper arrangement especially suited for being mounted upon a truck such as a pickup truck having a tailgate thereon; to provide such an arrangement in which the tent camper arrangement generally comprises a tent frame and a tent covering, the tent covering having a portion thereon which encloses the tailgate therein during assembly; to provide such an arrangement in which the tent and tent frame are maintained under tension by the tailgate pulling, by means of the tent covering, against the frame of the tent; to provide such an arrangement in which the tent covering includes an envelope portion thereon having an inner chamber which, during utilization of the arrangement, slidably receives the tailgate of the truck therein; to provide such an arrangement in which the tent frame generally comprises first and second arching cross-members oriented to arch diagonally across the truck bed and cross generally over a center thereof; to provide such an arrangement in which the tent covering includes a rear wall member having a doorway therein and the envelope portion attached thereto, whereby the rear door member opens generally over the tailgate during use, and whereby the envelope member generally provides for an extension of the floor of the tent beyond the rear bumper of the truck; to provide such an arrangement in which the envelope member is generally secured to the tailgate member by straps extending a substantial portion of the way around the tailgate member; to provide such an arrangement which is relatively inexpensive to produce; to provide such an arrangement which is relatively easy to manufacture, simple to use, and which is particularly well adapted for the proposed usages thereof; and to provide a method of enclosing a lowered pickup truck tailgate within a tent camper mounted upon the pickup truck, while concurrently anchoring a rear portion of the tent camper to an outer edge of the tailgate.

Other objects and advantages of this invention will become apparent from the following description taken in conjunction with the accompanying drawings wherein are set forth, by way of illustration and example, certain embodiments of this invention.

SUMMARY OF THE INVENTION

A pickup truck tent arrangement with a tailgate envelope is provided. Generally, the arrangement is for use in erecting a temporary tent-walled camper or shelter upon the bed of a truck such as a pickup truck. The arrangement generally includes a tent frame, a tent covering, and an envelope member that engages a tailgate of the truck.

The arrangement of the present invention is particularly adapted for use with a conventional pickup truck. Such trucks generally have a bed with sidewalls, a front wall and a tailgate. When the tailgate is raised, the bed is enclosed by the walls and tailgate to form a four-sided box; however, when the tailgate is lowered, the tailgate forms an extension of the bed beyond the rear bumper of the truck.

The sidewalls of such pickup trucks generally include stake-receiving holes therein. Usually, at least four such holes are positioned in the four corners of a rectangular pattern which is defined by the approximate ends of the sidewalls. During the erection of a tent camper such as that disclosed in the preferred embodiment, frame members either directly engage the stake-receiving holes, or engage anchors which are themselves engaged by the stake-receiving holes.

In the preferred embodiment, the frame comprises first and second arching cross-members which extend between anchors positioned in stake-receiving pockets diagonally opposite one another in the rectangular pattern. In this manner, the tent frame comprises first and second members arching diagonally over the truck bed and crossing over an approximate center thereof.

The tent camper arrangement or camper is, generally, formed by placement of a tent covering, such as a canvas, nylon or other conventional covering, over the erected frame, to enclose the truck bed. Generally, the tent covering is secured upon the frame by straps or the like which engage portions of the frame or the truck.

The present invention comprises the provision of means by which the tailgate is enclosed within the tent, when the tailgate is lowered. Generally, the tent covering includes a rear wall portion which faces rearwardly of the truck, when the tent covering is mounted upon the frame. The rear wall portion includes an outer edge which extends generally to, and ultimately engages, an outer edge of the lowered tailgate. Thus, the tent covering extends a significant way beyond the rear bumper of the truck, even though, in the preferred embodiment, substantially none of the tent frame extends past the rear bumper of the truck.

According to the invention, an envelope member is mounted along the outer edge of the rear wall portion of the tent covering. Generally, the envelope member defines an internal pocket which can be slid over the tailgate member to receive same therein. In this manner, the tent covering is generally attached to the tailgate member without the need for a special attachment means mounted on the tailgate member or associated therewith.

If the lengths of the rear wall portion and the sides of the envelope member are appropriately sized, with respect to one another and the tent frame, the weight of the tailgate member may be used to anchor the rear wall of the tent. That is, the outer edge of the tailgate will generally pull the tent covering rearwardly to help anchor the canvas and frame, under tension, in the truck. Thus, the rearward extension of the tailgate and rear wall member are used in a manner analagous to stakes and guy-lines for a conventional tent, in order to firmly support the tent and frame in an upright position. This may enable the tent covering, with an envelope member associated therewith, to be used in association with tent frames that should, preferably, be kept under tension.

The envelope arrangement of the preferred embodiment generally facilitates assembly of the tent camper. The envelope may be easily slid over the tailgate, in order to attach the tent covering to the tailgate or rear portion of the truck. Straps may be provided to encircle the tailgate and secure the envelope thereto. Therefore, the attachment means of the rear wall portion, or the envelope member, to the tailgate avoids the utilization of any members that must be somewhat permanently attached to or mounted upon the tailgate. Also, the arrangement may be utilized with a conventional truck, without modifications thereto. Further, the possibility of damage to the truck during assembly of the arrangement is substantially minimized.

The rear wall member, which faces generally rearwardly of the truck and toward the tailgate, may be provided with a door means therein permitting access to an interior of the erected tent camper. The door means may comprise a generally vertically extending opening, such as a zipper opening, in a center portion of the rear wall member, associated with a generally horizontally extending opening in a lower portion of the rear wall member. By this construction, the tailgate becomes a readily accessible threshhold area in the doorway of the tent camper.

The present invention also comprises the provision of a method of enclosing a lowered pickup truck tailgate within a tent camper; the method generally comprising the steps of: providing an arrangement having the envelope member thereon; and, erecting same within a truck bed with the envelope member slidably receiving the tailgate therein. The method can be relatively easily effected, even under emergency conditions, since the engagement of the truck, by the envelope member, is relatively easy to accomplish.

The drawings constitute a part of this specification and include exemplary embodiments of the present invention and illustrate various objects and features thereof. In some instances material thickness may be shown exaggerated, or reduced relative to other portions of the instant assembly, for clarity.

BRIEF DESCRIPTION OF THE DRAWINGS

FIG. 3 comprises an enlarged, fragmentary, rear elevational view of the assembly shown in FIG. 1, but with portions broken away to show internal details and with a rear door of the camper assembly opened.

FIG. 4 comprises an enlarged, fragmentary, side crosssectional view of a portion of the camper assembly, taken generally along line 4—4, FIG. 3.

FIG. 5 comprises an enlarged, fragmentary, bottom plan view of a portion of the camper unit taken generally from the perspective indicated by line 5—5 in FIG. 4.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but rather merely as a basis for the claims and as a representative basis for teaching one skilled in the art to variously employ the present invention in virtually any appropriately detailed structure.

Figure 1:
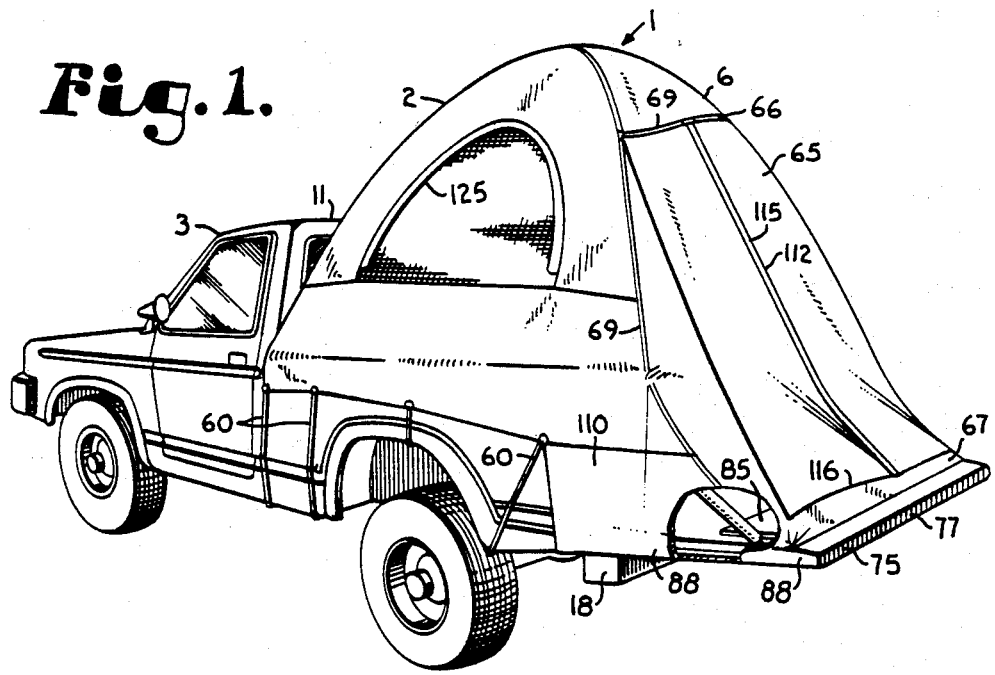
FIG. 1 is a perspective view of a pickup truck having a tent camper assembly, according to the present invention, mounted thereon, with portions broken away to show internal detail.

The reference numeral 1, FIG. 1 generally designates a pickup truck arrangement or camper assembly with a tailgate envelope according to the present invention. In FIG. 1, the arrangement 1 depicted generally comprises a camper unit 2 mounted upon a pickup truck 3. The camper unit 2 generally comprises a tent covering 6 mounted upon a frame 7, FIG. 2. The frame 7 is generally mounted to support the tent covering 6 over a bed 10 of the pickup truck 3.

Figure 2:
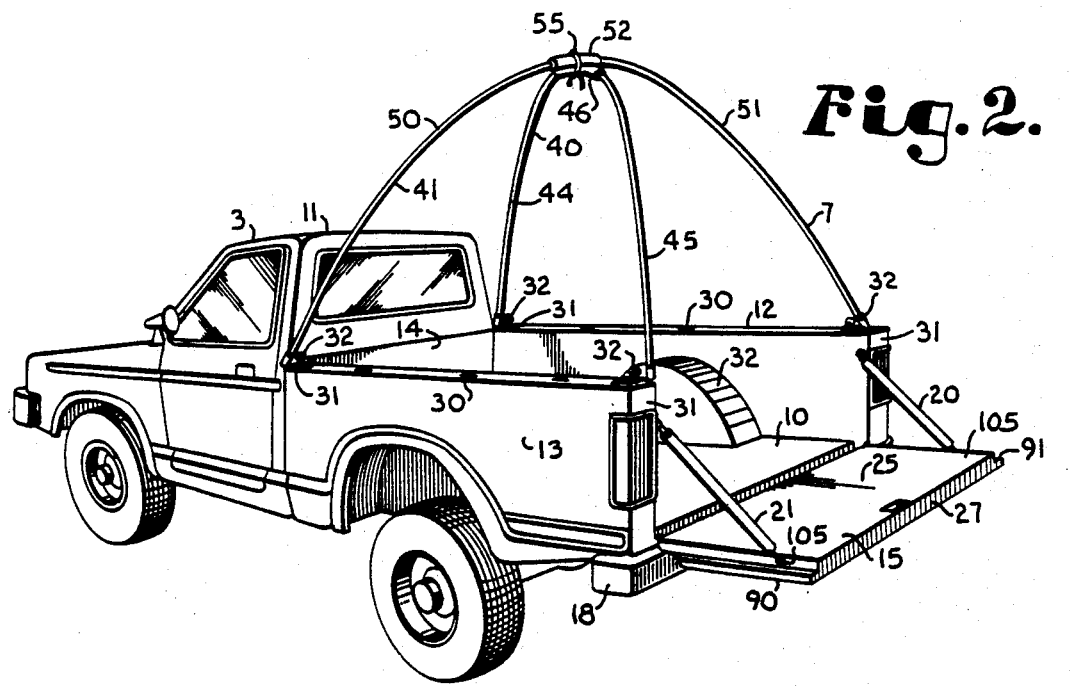
FIG. 2 is a perspective view, generally analogous to FIG. 1 but showing the tent camper assembly with a tent covering removed, so that internal portions of the assembly may be viewed.

Referring to FIG. 2, the pickup truck 3 is generally of a conventional type, and has a cab 11, the bed 10, sidewalls 12 and 13, a front wall 14 and a rear tailgate 15. The tailgate 15 is hingedly attached to the truck 3, in a conventional manner, near a rear bumper 18 of the vehicle, and may be raised, not shown, in a conventional manner to enclose the bed 10. Further, the tailgate 15 may be lowered, as shown in FIG. 2, to open the box previously formed by the sidewalls, front wall and tailgate, extending the bed 10 beyond the rear bumper 18 of the truck. In FIG. 2, supports 20 and 21 are shown, in a conventional manner, supporting the lowered tailgate 15. Such supports as supports 20 and 21 and may be provided by a variety of means. Through their utilization, an upper surface 25 of the lowered tailgate 15 forms an extension generally coplanar with the bed 10 of the truck 3.

Referring to FIG. 1, the present invention comprises a method and means for enclosing a lowered tailgate within the camper unit 2. In this manner, the camper unit 2 may extend beyond the rear bumper 18 of the truck 3, leading to a larger floor space in the camper unit 2. Further, the extension of the tailgate 15 well beyond the rear bumper 18 of the truck 3 permits an outer edge 27, FIG. 2, of the tailgate 15 to be used as an extended anchor point for the tent covering 6. This, as will be understood from the drawings and further description, permits the tent frame 7 to be kept under a tension which is provided by the outer edge 27 of the tailgate 15 pulling down on the tent covering 6. This kind of tension, it will be understood, is generally analogous to, and replaces, guy-lines which might be used on conventional tents and tent frames mounted upon the ground. Thus, the present invention can be used with a tent frame which is preferred be kept under tension, for support. Further, the extension of the tent covering 6 beyond the rear bumper 18 is fully supported by such utilization of the tailgate outer edge 27 without the need for extension of any portion of the frame 7 beyond the rear of the truck 3. This, generally, enables the utilization of a relatively simple frame construction and facilitates erection of the camper unit 2.

It is foreseen that the present invention may be utilized with a variety of tent frames 7. The frame 7 of the preferred embodiment, of the present invention, is most readily understood by reference to FIG. 2, as follows:

As is conventional for many pickup trucks, the pickup truck 3, shown in FIG. 2, includes a plurality of stake receiving holes 30 in each of the sidewalls 12 and 13. In conventional uses, stake-receiving holes 30 may be used to receive elongate stakes therein, the stakes being used to support loads that pile higher than the sidewalls 12 and 13. Generally, for a conventional truck 3, two lines of spaced stake-receiving holes 30 are present, one in each side wall.

For the frame 7 of the preferred embodiment, FIG. 2, those stake-receiving holes 30 positioned at four corners 31 of the sidewalls 12 and 13, in a rectangular pattern, are used to support the frame 7 in the truck 3. Referring to FIG. 2, the stake-receiving holes 30 at the four corners 31 include anchor inserts 32 therein. It is foreseen that, generally, a variety of anchors or anchor inserts 32 may be utilized in conjunction with the present invention aslong as appropriate means for engaging and supporting the frame 7 are provided. Therefore, the anchors 32 are not detailed herein.

The frame 7 is formed from first and second arching cross-members 40 and 41 which extend between diagonally opposite corners 31 of the rectangular pattern. The arching cross-members 40 and 41 are, preferably, formed from a flexible material such as plastic or the like, commonly used for flexible tent poles.

In FIG. 2, arching cross-member 40 shown includes a first segment 44 and a second segment 45 joined together, generally co-axially, by coupling 46. Similarly cross-member 41 comprises first segment 50 and second segment 51 joined together, generally co-axially, by coupling 52. Preferably, the arching cross-members 40 and 41 are appropriate sized to abut one other where they cross, and in FIG. 2 they are showed secured to one another by cord 55. In this manner, a relatively secure frame 7 is formed over the bed 10 of the truck 3.

In FIG. 1, the tent covering 6 is shown placed over the frame 7, to form the camper unit 2. Except as described below, generally the covering 6 is secured to the truck 3 by conventional attachment means such as strap and hook assemblies 60. Such attachment assemblies may be of a variety of designs and are well known in this art. Generally, it will be preferred that a design of straps and hooks be selected that will not be likely to subject the body of the truck 3 to any permanent damage during use, and further which may be relatively easily attached or disattached, for ease of assembly and disassembly.

Referring to FIG. 1, the tent covering 6 includes a rear wall member 65 which faces generally rearwardly of the truck 3 and extends out over the tailgate 15. Generally, the rear wall member 65 extends from a point or position 66 relatively high on the rear of the tent covering 6, to a lower outside edge or edge portion 67 which substantially abuts a portion of the tailgate 15 near outer edge 27. By reference to FIG. 1, it will be readily understood that the rear wall member 65 generally comprises a portion of the fabric covering 6 appropriately formed to be substantially continuous with the remainder of the covering 6, such as along seams 69.

According to the present invention, the camper unit 2 is provided with an envelope member 75, associated with the covering 6. The envelope member 75 is substantially attached to, and continuous with, the rear wall member 65 along its lower outside edge 67. Generally, the envelope member 75 comprises an envelope shaped portion of material 77 having an internal chamber and appropriately sized to receive a portion of the tailgate 15 therein. Since the rear wall member 65 is attached to, or alternatively integral with, the envelope member 75, whenever the envelope member 75 is slid over the tailgate 15 the rear wall member 65 will be securely anchored thereto.

The nature of the envelope member 75 will be further understood by reference to FIGS. 3, 4 and 5.

Referring to FIG. 4, the tailgate 15 is shown attached to the truck 3 by hinge means 80, so the tailgate 15 may be relatively easily raised or lowered. The tailgate 15 is received within an envelope 75 of fabric having an upper side 85, a lower side 86, and an end surface 87.

The end surface 87 generally engages the outer edge 27 of the tailgate 15.

Referring to FIG. 5, a bottom view of the tailgate 15 with the envelope member 75 thereon, the envelope member 75 includes side coverings 88 which wrap around outer side edges 90 and 91 of the tailgate 15. Thus, again, the envelope member 75 generally comprises a multi-sided envelope of material 77 having an open end suitably sized for slipping over the outer edge 27 of the tailgate 15, along with a portion of the tailgate 15 substantially adjacent to the outer edge 27, and enclosing same therein. When the tailgate 15, while enclosed within the envelope 75, is completely lowered, FIG. 4, the attached rear wall member 65 is anchored along its lower edge 67.

It is foreseen that in some applications it may be preferred to securely attach the envelope member 75 to the tailgate 15, so that it may not be readily slid off. A preferred method of accomplishing this is shown in FIGS. 4 and 5. A first, upper, strap 95 is shown attached, as by sewing or the like, to the upper side 85 of the envelope 75. A second, lower, strap 96 is attached to the lower side 86 of the envelope 75. The straps are sufficiently long to extend around an inner edge 100 of the tailgate 15. In the preferred embodiment, FIG. 5, three sets of such straps 101 are shown extending around the tailgate inner edge 100. The straps may engage one another by means of conventional buckles or the like, 103, for secure engagement. Thusly, the envelope member 75 is secured upon the tailgate 15 in a manner which is relatively easy to effect.

Referring to FIGS. 1 and 2, it will be understood that the envelope member 75 preferably includes appropriate means in its design for accommodation of the supports 20 and 21 where they attach to the tailgate 15. In the preferred embodiment, the envelope member sides 88 are attached to or integral with the envelope lower side 86, but not the upper side 85, at least where the supports 20 and 21 are located. By this arrangement the envelope member 75 may be slid onto the tailgate 15 without encountering the supports, FIG. 1. Another method would be to provide an envelope upper side, not shown, which does not extend as far down the tailgate 15 as are located anchor points 105 of the supports 20 and 21. Alternatively, it is foreseen that edges of the envelope member may include slits therein for sliding around the supports 20 and 21; or, if supports which can be disattached at the points 105 are used, then the envelope member 75 may include apertures therein, associated with the anchor points 105. For this latter arrangement, not shown, the supports 20 and 21 would be disattached while the envelope member 75 is slid over the tailgate 15, and then re-attached.

It will be understood from reference to FIG. 1, that the cover 6 generally includes a lower, rear, outside portion 110 which generally engages, or is integral with, the envelope member 75 outside of the support members 20 and 21, so that the tailgate 15 and supports 20 and 21 are generally completely enclosed within the tent covering 6.

In the preferred embodiment, the tailgate 15, when the camper unit 2 is assembled, forms a threshhold portion immediately within a doorway 112 to the camper unit 2. Referring to FIG. 1, the rear wall member 65 generally has a central, openable, substantially vertical slit 115 therein. Although a variety of types of slits 115 may be provided, generally an elongate slit such as that shown in FIG. 1, is preferred, and it includes zipper means, not shown, for opening and closing as selected. Further, substantially near the lower outside edge 67 of the rear wall member 65 extends generally horizontal slit means 116, also preferably open and closeable by zipper means, not shown. It will be readily understood that such an arrangement leads to the provision of a selectively openable doorway 112 to the inside of a camper unit 2, located in the rear wall member 65 of the tent covering 6. In FIG. 3, the camper unit 2 is shown with the rear doorway 112 opened. Flaps 121 in the doorway are shown tied back for convenience.

Referring to FIGS. 1 and 3, regardless of whether the doorway 112 is opened or closed, the tailgate 15, through its weight, generally stretches the rear wall member 65 outwardly and downwardly, anchoring the lower edge 67 thereof, at a point substantially beyond the rear bumper 18 of the truck 3. This, as indicated above, may be used to place the tent covering 6 and frame 7 under tension. Thus, the envelope member 75 provides a replacement for a guy-line type system to support the camper unit 2 under tension, and to keep the rear wall member 65 from sagging. This may be used to securely support the unit 2 within the truck 3. Further, it may permit the use of a frame 7, not shown, which should be maintained under substantial tension during erection.

Further, as understood by reference to FIGS. 1 and 2, the invention provides a solution to the problem of having a tailgate 15 enclosed within the tent covering 6, where the frame 7 does not extend beyond the rear bumper 18 of the truck 3. This, it is believed, facilitates simpler frame 7 construction and assembly. Further relatively small frame members, such as segments 44, 45, 50 and 51, , which would be relatively easy to store and transport, are permitted by such an arrangement.

As indicated above, a variety of tent frames 7 may be utilized with an arrangement having an envelope member 75 according to the present invention. Further, it is believed that a variety of tent coverings 6 may be also utilized; and, generally, various types of frames 7 would be expected to each require a particular style of covering. Some coverings 6, FIG. 1, may include windows 125 or the like therein.

By the above arrangement, a relatively secure camper unit 2, or emergency shelter, may be mounted upon a rear bed of a pickup truck 3.

Generally, in use, camper units 2 according to the present invention would be assembled only when the vehicle or truck 3 is parked at a location where it is intended to remain for a substantial period of time. However, it is foreseen that due to the secure anchoring, in part afforded by the tailgate envelope 75, the camper unit 2 would be expected to remain erect, even if the truck 3 were driven for short distances. At some point, however, winds generated by the speed of a truck 3 would be expected to strain or even collapse the camper unit 2.

It will be readily understood that the above described apparatus generally suggests a method of enclosing a tailgate 15 within a camper unit 2, and also anchoring a rear wall member 65 of the camper unit 2. The method generally comprises the steps of: providing a frame for the camper unit or camper; providing an appropriate tent covering for the camper, while providing an envelope member on a rear wall member of the tent covering; and, assembling the unit by mounting the frame on a truck and mounting the tent covering upon the tent frame, with a tailgate outer edge inserted into the envelope member.

It is noted that while the present invention has been described for use with a pickup truck, it could be used for a variety of trucks having a member analogous to the tailgate member.

It is to be understood that while certain forms of the present invention have been illustrated and described, it is not to be limited to the specific forms or arrangements herein described and shown.

I claim:

1. A tent camper for mounting on a truck such as a pickup truck; the truck having a bed and a rear tailgate, the tailgate having an outer edge and being positionable in a raised orientation, and a lowered, generally horizontal, orientation; said tent camper comprising:
   (a) a tent frame mountable on the truck for supporting the tent camper;
   (b) a tent covering mountable on said frame to form a tent over the pickup truck bed;
      (i) said tent covering having a rear wall member facing generally rearwardly of the truck and toward the tailgate, during tent camper assembly; said rear wall member having an outer edge positionable generally adjacent a portion of the tailgate near the tailgate outer edge when the tailgate is lowered; and
   (c) an envelope member in the tent covering mounted on and positioned along said rear wall member outer end;
      (i) said envelope member having an inner envelope chamber sized for slidably receiving the tailgate outer edge therein, along with an immediately adjacent portion of the tailgate;
   (d) whereby, when said tent camper is operationally assembled, said envelope member: secures said tent covering to the lowered tailgate; extends the tent covering over the tailgate; and, provides a rear tension anchor for said outer end of said tent covering rear wall member.

2. A tent camper according to claim 1 wherein:
   (a) said rear wall member includes means for selectively providing a doorway therein, to permit entrance into and out of said tent camper;
   (b) whereby, when said tent camper is operationally assembled, the lowered tailgate forms a floor of said tent camper immediately adjacent a threshhold of said doorway.

3. A tent camper according to claim 1 wherein:
   (a) said tent frame includes a first diagonally arching cross-member and a second diagonally arching cross-member;
      (i) said first and second cross-members being oriented to cross one another generally over a center of the truck bed; and
      (ii) said first and second cross-members being mounted upon sidewalls of the truck;
   (b) whereby said first and second cross-members form a support frame which does not extend beyond a rear bumper of the truck, and which supports said tent covering with said envelope member to form said tent camper.

4. A tent camper according to claim 1 wherein:
   (a) said envelope member includes an upper side which extends generally over the tailgate, when the tent camper is operationally assembled;
   (b) said envelope member includes a lower side which extends generally under the tailgate, when the tent camper is operationally assembled; and
   (c) said envelope member includes at least one strap means thereon having means for securely mounting said envelope member on said tailgate by extension of said strap means around a portion of the tailgate not completely received within said envelope member, with extension of said strap means being between said envelope member upper and lower sides;
   (d) whereby said envelope member may be selectively secured to the lowered tailgate, when said tent camper is operationally assembled.

5. A tent for mounting upon a tent frame erected in a truck such as a pickup truck; the pickup truck having a bed and a rear tailgate, the tailgate having an outer edge and being positionable in a raised orientation, and a lowered orientation; said tent comprising:
   (a) an outer fabric covering mountable on the tent frame to form a tent structure over the pickup truck bed;
      (i) said outer fabric covering having a rear wall member facing generally rearwardly of the truck and toward the tailgate during tent assembly; said rear wall member having an outer end positioned generally adjacent a portion of the tailgate near the tailgate outer edge when the tailgate is in the lowered orientation; and
   (b) an envelope member mounted on said rear wall member outer end;
      (i) said envelope member having an inner envelope chamber sized for slidably receiving the tailgate outer edge therein, along with an immediately adjacent portion of the tailgate;
   (c) whereby, when said tent is operationally assembled, said envelope member: secures said fabric covering to the lowered tailgate; extends the fabric covering over the tailgate; and provides a rear anchor for said outer end of said rear wall member.

6. A method of enclosing a lowered pickup truck tailgate within a tent camper, when the tent camper is mounted on a pickup truck, and concurrently anchoring a rear portion of the tent camper to an outer edge of the tailgate; said method including the steps of:
   (a) providing a frame for said tent camper, said frame being mountable on the pickup truck;
   (b) providing a tent covering for said tent camper;
      (i) said tent covering having a rear wall member facing generally rearwardly of the truck and toward the tailgate; said rear wall member having an outer end positionable generally adjacent a portion of the tailgate substantially near the tailgate outer edge, during mounting of said tent covering on said frame;
   (c) providing an envelope member in the tent covering mounted on said rear wall member outer end;
      (i) said envelope member having an inner envelope chamber sized for slidably receiving the tailgate outer edge therein, along with an immediately adjacent portion of the tailgate;
   (d) mounting said frame on the truck; and
   (e) mounting the tent covering on the tent frame with the tailgate outer edge inserted into the envelope member;
   (f) whereby the envelope member: secures said tent covering to the lowered tailgate; extends the tent covering over the tailgate; and, provides a rear anchor for said outer end of said tent covering rear wall member.

* * * * *